United States Patent Office 3,330,729
Patented July 11, 1967

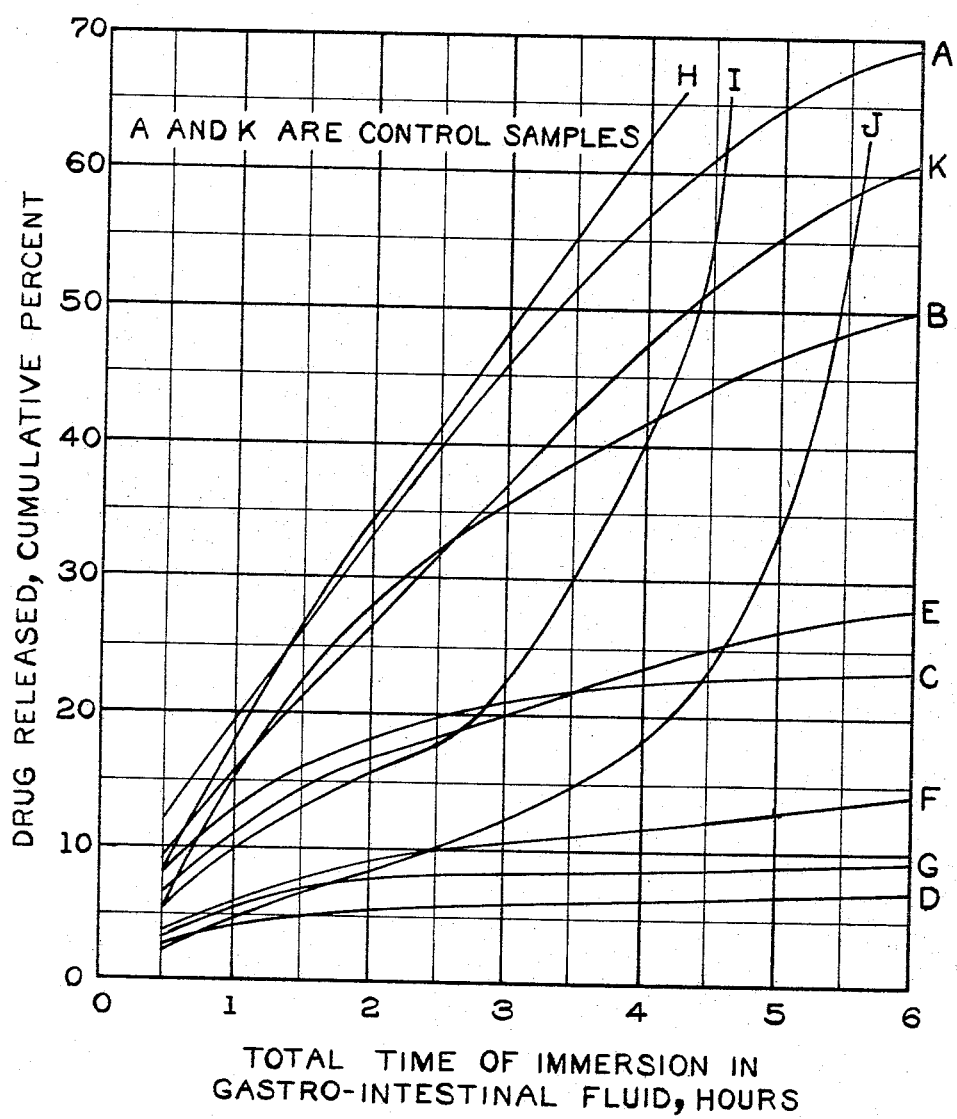

3,330,729
SUSTAINED RELEASE TABLET CONTAINING MEDICAMENT ADMIXED IN A WATER-INSOLUBLE ACRYLIC ACID CROSS-LINKED POLYMER AND SELECTED BASIC MAGNESIUM OR CALCIUM DILUENT
Carl H. Johnson, Jr., North Olmstead, Ohio, assignor to The B. F. Goodrich Company, New York, N.Y., a corporation of New York
Filed Oct. 4, 1963, Ser. No. 314,012
3 Claims. (Cl. 167—82)

This invention relates to medicinal compositions for oral administration in the form of tablets, which tablets have the ability to release the medication in the gastrointestinal tract gradually over a relatively long period of time. More specifically, this invention relates to compressed tablets having delayed or sustained release characteristics which contain, in addition to the medicinal agent, a water-insoluble, cross-linked polymer of arcylic acid and a particular, very slightly water-soluble, basic magnesium or calcium compound.

Delayed release pharmaceutical tablets containing cross-linked polymers of arcylic acid are described in U.S. Patents No. 3,065,143 and No. 3,074,852. These acrylic acid copolymers are water-insoluble, but being hydrophilic, they readily hydrate, absorb water and become swollen when in contact with water at body temperature. Consequently, tablets containing a polymer of the class described will not immediately dissolve or disintegrate on contact with the gastric and intestinal fluids if, as the aforementioned patents disclose, the proportion of polymer in the tablet is sufficiently large. The sustained release mechanism for these polymer-containing tablets is believed to derive from the formation of a protective barrier of gelled material at the surface of the tablet due to the said swelling of the polymer. This barrier is only slightly permeable to water and thus permits only slow diffusion of fluids into and through the interior of the tablet. Some of the medicinal agent is taken into the gastro-intestinal system by the diffused fluid. Occurring simultaneously with the diffusion process is a wearing away of the gel layer of the tablet caused by its motion in the gastrointestinal tract. As the gel layer is worn away, carrying some of the admixed medicament with it, fresh gelled material is exposed and the process continues. Thus, the tablet is slowly disintegrated, effecting slow release of the drug contained therein, generally at a substantially constant rate.

As stated above, the tablets described in the aforementioned prior art must contain a large proportion of the acrylic acid polymer to obtain the sustained release effects, more explicitly, at least one-third by weight of these tablets is composed of the polymer. It has now been discovered that a tablet containing at least one inexpensive, basic, pharmaceutically acceptable, particular calcium or magnesium compound in admixture with the medicament and the insoluble cross-linked polymer of acrylic acid, and, optionally, other inert diluents, requires a lesser amount of the acrylic acid polymer to obtain the same degree of sustained release as that obtained with a tablet containing a greater amount of polymer and none of the particular basic compound. It also has been found that in comparing tablets containing the same amounts of acrylic acid polymer and medicament, those additionally containing the basic diluent have considerably slower release than tablets lacking such material. The basic diluents suitable for the compositions embodied herein are magnesium oxide, magnesium hydroxide and calcium hydroxide.

The pharmaceutical tablet of this invention is in the form of a compressed, substantially uniform mixture comprising an effective amount of a drug, at least 5 percent by weight of a water-absorbent cross-linked polymer of acrylic acid, and one or more of the aforesaid basic diluents, the weight ratio of polymer to basic diluent being within the range of about 0.3:1 to about 10:1.

The cross-linked polymer of acrylic acid, also known as a "carboxy vinyl polymer" or "carboxypolymethylene," which is embodied in the tablet composition of this invention, is described in U.S. Patent No. 2,798,053, issued July 2, 1957, wherein detailed particulars on composition and method of preparation are set forth. Briefly stated, the material is a polymer of acrylic acid which is cross-linked with from about 0.75 to about 2% by weight of the polymer, preferably about 1%, of a copolymerized polyalkenyl polyether. The polymerization of the monomers ordinarily is carried out in an inert hydrocarbon diluent with a free-radical catalyst. The preferred cross-linking polyalkenyl polyether monomers are polyallyl sucrose and polyallyl pentaerythritol, desirably containing an average of at least 3 allyl groups for each molecule of sucrose or pentaerythritol, the allyl groups attached thereto by means of ether linkages. The preferred polyallyl sucrose contains an average of 5 to 6 allyl groups per molecule of sucrose (theoretical maximum is 8 allyl groups) and the preferred polyallyl pentaerythritol contains 4 allyl ether groups per molecule (the theoretical maximum). The carboxypolymethylenes embodied herein are high molecular weight polymers, e.g., usually having a molecular weight greater than 200,000 and preferably greater than 300,000. They are recovered from their polymerization media as white powder.

The pharmaceutically acceptable basic diluents which are embodied in the compositions of this invention are limited to three compounds, specifically, magnesium oxide, calcium hydroxide and magnesium hydroxide. These said compounds are only slightly soluble in water, e.g., 0.0086 gram per 100 ml. of water at 30° C., 0.158 gram per 100 ml. at 25° C. and 0.0009 gram per 100 ml. at 18° C., respectively. Despite this slight solubility, these compounds impart an alkaline reaction to water. Calcium hydroxide is the most effective agent with respect to inhibiting tablet disintegration, but the magnesium compounds are somewhat preferred because of their relatively weaker alkaline reaction in water. Oddly, it has been discovered that calcium carbonate and magnesium carbonate are not suitable for use as the basic diluent in the tablets. Although the carbonates are also slightly soluble in water (0.0014 gram and 0.011 gram per 100 ml. at 25° C., respectively) and impart slight alkalinity thereto, the tablets containing same in conjunction with the carboxy vinyl polymer show improved sustained release only for about 1 to 3 hours and then disintegrate rapidly.

The weight ratio of the carboxy vinyl polymer to the basic diluent in the tablets prepared according to the present invention may be within the range of about 0.3:1 to about 10:1. The preferred weight ratio is from about 0.5:1 to about 2.5:1. As the weight ratio of polymer to basic diluent is increased (less basic diluent in the tablet), the diluent is less effective in magnifying the efficacy of the delayed release characteristic which the polymer imparts to the tablet. Sustained release of the drug over an extended period, e.g., at least about four hours, is obtained with tablets containing as little as about 5 percent by weight of carboxy vinyl polymer. Appropriate balancing of the polymer content and the ratio thereof to the basic diluent in the tablet permits a sustained release period of up to about 48 hours, the prime governing factor in the selection of the proportions being the type and amount of medicament administered and the desired period of release. As a practical matter, the polymer content of the tablet need not be greater than about 25 percent by weight, although amounts of up to 90% are operable. The preferred amount of polymer is 10 to 15%. The exact mechanism which is responsible for the attainment of improved sustained release action is not known. However, it is believed that the basic diluent may in part react chemically with the acrylic acid polymer in the gastro-intestinal aqueous fluid environment, forming insoluble magnesium and calcium salts. The salts form an unswellable matrix that counteracts the swollen hydrated polymer matrix and thus increases the relative imperviousness of the tablet to pentration by the fluid.

The nature of the drug carried in the tablets is immaterial provided it is compatible with the basic diluent and stable in contact therewith; it may be soluble or insoluble in water, or strong or comparatively mild, which factors, together with the anticipated period of release, are determinative of the amount of drug. Numerous drugs are advantageously adapted to and contemplated for sustained release, for example, vitamins, antihistamines, antinauseants, hypotensive agents, muscle relaxants, antibiotics, anticonvulsants and others.

The tablets may contain variable amounts of inert diluents or fillers having little or no medicinal value, such as starch, talc, lactose and etc. to provide body, especially when the drug concentration therein is low. Depending on the effect desired, the tablet may contain from 0 to about 75% by weight of the inert diluent. However, as aforementioned, the amount of the acrylic acid polymer in the tablet should be at least about 5% by weight for satisfactory results.

The tablets embodied herein may be simply prepared by well-known means, such as by intimately mixing the granulated and powdery ingredients together, desirably with from about 1 to 5 weight percent of a suitable lubricant, until a substantially uniform mixture is obtained and compressing the powder mixture into tablets using conventional apparatus.

The following examples and specific embodiments are presented to illustrate and clarify the invention and are not meant to be limiting, as it is understood that the invention is subject to numerous variations and modifications without departing from the scope and spirit thereof as defined by the claims.

A series of tablets were prepared having the following formulation, the amounts of the ingredients being in percent by weight of total tablet weight.

| | |
|---|---|
| Riboflavin-5-phosphate | 1.67 |
| Magnesium stearate (lubricant) | 1.00 |
| Carbopol 934 [1] (carboxy vinyl polymer) | 25.00 |
| Diluent | 72.33 |

[1] "Carbopol 934" (a product of the B. F. Goodrich Chemical Company) is a polymer of acrylic acid cross-linked with 1% of a polyallyl ether of sucrose having an average of about 5.8 allyl groups per each sucrose molecule.

The composition of the diluent portions of the tablets are given below in Table I. The weight ratio of the carboxy vinyl polymer to the magnesium and calcium compound is also given.

TABLE I

| Sample No. | Diluents, wt. Percent of Tablet | Weight Ratio of Carbopol to Basic Diluent |
|---|---|---|
| A | Lactose, 72.33 | (1) |
| B | Lactose, 62.33 / Ca(OH)$_2$, 10.00 | 2.5:1 |
| C | Lactose, 47.33 / Ca(OH)$_2$, 25.00 | 1:1 |
| D | Ca(OH)$_2$, 72.33 | 0.35:1 |
| E | Lactose, 47.33 / MgO, 25.00 | 1:1 |
| F | Lactose, 22.33 / MgO, 50.00 | 0.5:1 |
| G | MgO, 72.33 | 0.35:1 |
| H | Lactose, 47.33 / CaCO$_3$, 25.00 | 1:1 |
| I | Lactose, 22.33 / CaCO$_3$, 50.00 | 0.5:1 |
| J | CaCO$_3$, 72.33 | 0.35:1 |

[1] Control.

An additional control tablet, sample K, had the following formulation:

| | Wt. percent |
|---|---|
| Riboflavin-5-phosphate | 1.67 |
| Magnesium stearate | 1.00 |
| Carbopol 934 | 35.00 |
| Lactose | 62.33 |

The aforesaid tablets were prepared by mixing the powdered ingredients together and compressing the dry blends on a Stokes single punch tableting machine using 0.625 inch concave dies. Tablet size and tablet weight were uniform. Each tablet weighed 0.225 gram and had a Strong-Cobb Hardness of 20 to 25 units.

The drug-release rates of the tablets were determined by the standard U.S.P. method using the conventional Stoll-Gershberg disintegration apparatus. Six tablets of each formulation were placed in the basket of the apparatus, and the basket was immersed into a 1000 ml. beaker containing 600 ml. of a simulated gastric juice (one liter of hydrochloric acid-water solution of pH=1.2 containing two grams of dissolved sodium chloride). After 30 minutes, half of the simulated gastric fluid in the test beaker was replaced by a simulated intestinal fluid (one liter of sodium hydroxide solution of pH=7.5 containing 6.8 grams of dissolved monobasic potassium phosphate). Every hour thereafter, half of the contents of the beaker was again replaced by simulated intestinal fluid. The temperature of the simulated fluid was maintained at 37° C.±2° C. At regular intervals, small samples of the fluid were taken from the beaker and analyzed to calculate the cumulative amount of the drug released from the tablets. The determinations were made by means of a spectrophotometric analysis which measured the concentration of dissolved riboflavin-5-phosphate. The results of the disintegration tests are tabulated in Table II. The symbol (−) in the table indicates that the measurement was not made.

TABLE II.—CUMULATIVE PERCENT OF DRUG RELEASED vs. TIME OF IMMERSION IN GASTRO-INTESTINAL FLUID

| Time, Hours | Sample No. | | | | | | | | | | |
|---|---|---|---|---|---|---|---|---|---|---|---|
| | A | B | C | D | E | F | G | H | I | J | K |
| 0.5 | 11.9 | 5.6 | 9.1 | 2.4 | 6.4 | 3.5 | 3.1 | 9.0 | 6.3 | 2.7 | 7.9 |
| 1.5 | 25.5 | 22.8 | 15.7 | 5.1 | 13.8 | 7.8 | 8.1 | 26.1 | 13.1 | 7.1 | 21.6 |
| 2.5 | 39.2 | 31.6 | 19.8 | 5.6 | 17.4 | 9.8 | 8.1 | 39.3 | 17.6 | 9.7 | 31.3 |
| 3.5 | 51.2 | 37.6 | 21.0 | 5.7 | 21.6 | 10.8 | 9.2 | 54.0 | 27.0 | 15.1 | 42.2 |
| 4.5 | (−) | 43.7 | 21.0 | (−) | 24.8 | 12.6 | (−) | 65.4 | 55.5 | 22.5 | 51.1 |
| 20.7 | (−) | (−) | (−) | (−) | 57.8 | (−) | (−) | (−) | (−) | (−) | (−) |

The data in Table II are offered pictorially in FIGURE 1. The figure presents plots of the total time of immersion of the tablet samples in the gastro-intestinal fluid vs. the cumulative percentage of drug released therefrom. The figure shows that although calcium carbonate (samples H, I and J) retards the early release rate, the subsequent disintegration behavior of the tablets containing same is rather erratic and abrupt. The figure also shows graphically that the tablets containing both the acrylic acid polymer and the basic diluent embodied in the invention have a higher degree of delayed release than the tablets containing a like amount or larger amount of polymer alone.

I claim:

1. A sustained release pharmaceutical tablet for oral administration in the form of a compressed, substantially uniform mixture comprising (A) an effective amount of medicament, (B) at least 5% by weight of a water-absorbent polymer of acrylic acid cross-linked with from about 0.75 to about 2%, based on the weight of the polymer, of a polyalkenyl polyether, and (C) at least one basic diluent selected from the group consisting of calcium hydroxide, magnesium hydroxide and magnesium oxide, the weight ratio of polymer to basic diluent being within the range of about 0.3:1 to about 10:1.

2. The tablet according to claim 1 wherein the polymer of acrylic acid is cross-linked with polyallyl sucrose.

3. A sustained release pharmaceutical tablet for oral administration in the form of a compressed, substantially uniform mixture comprising (A) an effective amount of medicament, (B) from 5 to about 25% by weight of a water-absorbent polymer of acrylic acid cross-linked with from about 0.75 to about 2%, based on the weight of the polymer, of polyallyl sucrose, and (C) at least one basic diluent selected from the group consisting of calcium hydroxide, magnesium hydroxide and magnesium oxide, the weight ratio of polymer to basic diluent being within the range of about 0.5:1 to about 2.5:1.

References Cited

UNITED STATES PATENTS

| | | | |
|---|---|---|---|
| 2,887,439 | 5/1959 | Klioze et al. | 167—82 |
| 2,909,462 | 10/1959 | Warfield et al. | 167—56 |
| 2,912,358 | 11/1959 | Staib | 167—55 |
| 3,033,754 | 5/1962 | Krahnke et al. | 167—82 |
| 3,065,143 | 11/1962 | Christenson et al. | 167—82 |
| 3,074,852 | 1/1963 | Mayron | 167—82 |

LEWIS GOTTS, *Primary Examiner.*

S. K. ROSE, *Assistant Examiner.*